(12) United States Patent
Krull et al.

(10) Patent No.: US 6,901,330 B1
(45) Date of Patent: May 31, 2005

(54) NAVIGATION SYSTEM, METHOD AND DEVICE WITH VOICE GUIDANCE

(75) Inventors: Jay Dee Krull, Olathe, KS (US); Scott M. Burgett, Overland Park, KS (US); Shane R. Runquist, Austin, TX (US); Jarrod W. Seymour, Redondo Beach, CA (US)

(73) Assignee: Garmin Ltd. (KY)

( * ) Notice: Subject to any disclaimer, the term of this patent is extended or adjusted under 35 U.S.C. 154(b) by 66 days.

(21) Appl. No.: 10/029,732

(22) Filed: Dec. 21, 2001

(51) Int. Cl.[7] ............................................. G01C 21/00
(52) U.S. Cl. ................. 701/211; 701/213; 342/357.06; 340/995.2
(58) Field of Search ................................ 701/201–213; 340/995.2; 342/357.1, 357.06, 357.08, 357.13; 709/203

(56) References Cited

U.S. PATENT DOCUMENTS

| | | | |
|---|---|---|---|
| 5,243,529 A | 9/1993 | Kashiwazaki | |
| 5,343,399 A | 8/1994 | Yokoyama et al. | 364/449 |
| 5,410,486 A | 4/1995 | Kishi et al. | 364/449 |
| 5,452,212 A | 9/1995 | Yokoyama et al. | 364/449 |
| 5,452,217 A | 9/1995 | Kishi et al. | 364/494 |
| 5,475,599 A | 12/1995 | Yokoyama et al. | 364/449 |
| 5,506,578 A | 4/1996 | Kishi et al. | 340/996 |
| 5,528,248 A | 6/1996 | Steiner et al. | 342/357 |
| 5,537,323 A | 7/1996 | Schulte | 364/449 |
| 5,793,631 A | 8/1998 | Ito et al. | 364/449.5 |
| 5,809,447 A | 9/1998 | Kato et al. | 701/211 |
| 5,938,721 A | 8/1999 | Dussell et al. | 701/211 |
| 5,946,687 A | 8/1999 | Gehani et al. | |
| 6,161,092 A | 12/2000 | Latshaw et al. | 704/270 |
| 6,172,641 B1 | 1/2001 | Millington | 342/357.13 |
| 6,182,010 B1 * | 1/2001 | Berstis | 701/211 |
| 6,199,013 B1 | 3/2001 | O'Shea | 701/211 |
| 6,266,612 B1 | 7/2001 | Dussell et al. | 701/207 |
| 6,317,684 B1 | 11/2001 | Roeseler et al. | 701/202 |
| 6,317,687 B1 | 11/2001 | Morimoto et al. | 701/211 |
| 6,321,158 B1 | 11/2001 | DeLorme et al. | 701/201 |
| 6,347,280 B1 | 2/2002 | Inoue et al. | 701/211 |
| 6,411,899 B2 | 6/2002 | Dussell et al. | 701/211 |
| 6,526,350 B2 * | 2/2003 | Sekiyama | 701/209 |
| 2002/0093493 A1 | 7/2002 | Michaeli et al. | 345/173 |
| 2003/0139150 A1 | 7/2003 | Rodriguez et al. | 455/90.1 |

OTHER PUBLICATIONS

"An optimal pathfinder for vehicles in real–world digital terrain maps", http://www.nease.net/jamsoft/shortestpath/pathfinder/4.html, 11 pages, (1999).

"Informed Search Methods", *Artificial Intelligence, A Modern Approach*, Prentice Hall, Inc., pp. 92–115, (1995).

"Real–Time Vehicle Routing in Dynamic and Stochastic Urban Traffic Networks", http://www.gpu.srv.ualberta.ca/lfu/research.htm, pp. 1–3, (1997).

Ahuja, R., et al., "Faster Algorithms for the Shortest Path Problem", *Journal of the Association for Computing Machinery*, 37(2), pp. 213–223, (1990).

(Continued)

*Primary Examiner*—Richard M. Camby
(74) *Attorney, Agent, or Firm*—Devon A. Rolf

(57) ABSTRACT

Systems, devices and methods are provided for an improved navigational route planning device which provides clear and concise guidance through decision points along a route by providing assistance that is more understandable, accurate and timely. One aspect provided herein is an electronic navigational aid device with voice guidance. The device includes a processor and a memory adapted to communicate to the processor. The memory is adapted to store cartographic data and a route to a desired destination. The device processes travel along the route, recognizes when the device is approaching a decision point in the route, and provides voice guidance for the decision point. According to one embodiment, the voice guidance includes an initial voice guidance, an advance voice guidance, and a confirmation voice guidance. Other aspects are provided herein.

52 Claims, 13 Drawing Sheets

OTHER PUBLICATIONS

Cung, V., et al., "An Efficient Implementation of Parallel A*", *CFPAR*, Montreal, Canada, pp. 153–167, (1994).

Fredman, M., et al., "Fibonacci heaps and their uses in improved network optimization algorithms", *Journal of the ACM*, *34(3)*, 2 pages, (1987).

Fu, L., "Heuristic Shortest Path Algorithms and their Potential IVHS Applications", *Proceedings of the Fourth University of Alberta—University of Calgary, Joint Graduate Student Symposium in Transporation Engineering*, pp. 83–109, (1995).

Ikeda, T., et al., "A Fast Algorithm for Finding Better Routes by AI Search Techniques", *Vehicle Navigation and Information Systems Conference Proceedings*, pp. 291–296, (1994).

Kaindl, H., et al., "Memory–Bounded Bidirectional Search", *Proceedings of the 12th National Conference on Art*, AAAI Press, Seattle, WA, pp. 1359–1364, (1994).

Laporte, G., "The Vehicle Routing Problem: An overview of exact and approximate algorithms", *European Journal of Operational Research*, *59*, pp. 345–358, (1992).

Myers, B., "Data Structures for Best–First Search", http://www4.ncsu.edu/jbmyers/dsai.htm, pp. 1–6, (1997).

Ronngren, R., et al., "Parallel and Sequential Priority Queue Algorithms", *ACM Transactions on Modeling and Computer Simulation*, *7(2)*, pp. 168–172, 198, 199, (1997).

Stout, B., "Smart Moves: Intelligent Pathfinding", *Gamasutra*, http://www.gamasutra.com/features/programming/080197/pathfinding.htm, pp. 1–11, (1997).

Wai, L., et al., "Comparative Study of Shortest Path Algorithm for Transport Network", *USRP Report 2*, http://www.comp.nus.edu.sg.leonghoe/USRPreport–txt.html, pp. 1–10, (1999).

Zhan, F.B., "Three Fastest Shortest Path Algorithms on Real Road Networks: Data Structures and Procedures", *Journal of Geographic Information and Decision Analysis*, *1(1)*, http://www.geog.uwo.ca/gimda/journal/vol1.1/Zhan/Zhan.htm, 11 pages, (1997).

Zhao, Y., et al., "An Adaptive Route–Guidance Algorithm for Intelligent Vehicle Highway Systems", *American Control Conference*, Boston, MA, Department of Electrical Engineering and Computer Science, The University of Michigan, pp. 2568–2573, (1991).

Office Action from related U.S. Appl. No. 10/273,247 (Attorney Docket No. 1528.063US1), Sep. 24, 2004; 11 pgs.

"Office Action from related U.S. Appl. No. 10/273,247 (Attorney Docket No. 1528.063US1)", (Sep. 24, 2004), 11 Pages.

* cited by examiner

FIG. 3A                        FIG. 3B

NAVIGATION SYSTEM, METHOD AND DEVICE WITH VOICE GUIDANCE

CROSS REFERENCE TO RELATED APPLICATIONS

This application is related to the following co-pending, commonly assigned U.S. patent application: "Navigation System, Method and Device with Automatic Next Turn Page," Ser. No. 10/029,917, which is filed on even date herewith and which disclosure is herein incorporated by reference.

FIELD OF THE INVENTION

The present invention relates generally to navigational devices, and in particular to navigational devices with voice guidance.

BACKGROUND OF THE INVENTION

Route planning devices are well known in the field of navigational instruments. The method of route planning implemented by known prior art systems depends on the capabilities of system resources, such as processor speed and the amount and speed of memory. As increased system capability also increases system cost, the method of route planning implemented by a navigation device is a function of overall system cost.

One feature of increased system capability cost involves the amount of assistance provided at decision points. Many conventional navigational devices simply do not incorporate added assistance at decision points. Thus, a user of such a device may often get turned around or confused in unfamiliar territory. This is complicated by the fact that the circumstances such as highway or inner city traffic conditions, often do not allow a user to pause and carefully consider a course of action at the decision point.

Conventionally, commercial auto clubs such a AAA® provide instructions for a course of action at various decision points, but without any real time added guidance or assistance for the same. Typically, the recipient of these services is provided with a set of paper maps, some even highlighting the route. However, the individual navigating the route must repeatedly flip through and study these maps before their travel and again in route. Extra attention must be given to these maps when the traveler reaches decision points in their journey. This places the user back in a compromising position when in heavy traffic conditions, as mentioned above. Even more, without self initiated independent study, the user is not provided with any sort of advance notice or warning for when these decision points are approaching. Thus, without careful planning the user can easily miss the decision point or not afford themselves with enough advance notice to be in the right position to navigate a course through the decision point.

On line map services such as MapQuest® provide similar sets of instructions for a course of action at decision points along a route, but again without any real time added guided or assistance for the same. The users of these systems also print out paper maps which they must flip through and in a self initiated independent fashion negotiate.

Finally, some navigation devices may attempt to provide a user with navigational aids for decision points while traversing a planned route. However, these systems, particularly low cost free standing navigation systems, limit such assistance to precanned bitmaps of symbols. For example, these systems may provide a turn arrow symbol indicating a direction to take at a decision point. While precanned bitmap navigational aids may be helpful in some instances, they generally do not provide enough instructional aid to a user in unfamiliar surroundings, particularly in a congested network of thoroughfares. Moreover, these devices do not provide any added assistance to negotiate among the many courses of action which match the instruction of the precanned bitmap symbol in a crowded network of thoroughfares. In other words, a left turn arrow symbol does not assist a user to understand which of several immediately approaching left turns to take.

In summary, a user of existing navigational aids may frequently find themselves missing decision points altogether, or not being in a correct position to navigate a course through an upcoming decision point. As such a user who is unsure about an upcoming decision may have to halt their travel to decipher the ambiguity. Clearly, in many cases halting travel is not a viable alternative. For example, when the user is traveling on an interstate it is entirely impossible to simply stop. The alternative of pulling off on the shoulder is undesirable and can be dangerous. Pulling off on an exit is equally undesirable since doing so increases travel time and provides an added inconvenience to the user. In other instances, such as navigating downtown city streets, the traffic issues alone may prevent the user from stopping their vehicle to reorient themselves or recalculate a route. Even if the user has the ability to safely stop their vehicle, such as when traveling in a neighborhood, the inconvenience factor is present. Moreover, when the user entirely misses the decision point the headache and frustration of navigating their route is compounded, leaving the user to further resolve how to back track and again attempt to negotiate the missed decision point.

Current prior art systems have created a spectrum of products in which the degree of navigational accuracy is dictated primarily by the cost of the system. The lower cost systems currently offer a low degree of accuracy that is often inadequate for users.

Therefore, there exists a need for a navigational route planning device which is more efficient and accurate than current low cost systems, without requiring more expensive system resources. In addition, there is also a need for a navigational route planning device which provides clear and concise guidance through decision points along a route by providing assistance that is more understandable, accurate and timely.

SUMMARY OF THE INVENTION

The above mentioned problems of navigational devices are addressed by the present invention and will be understood by reading and studying the following specification. Systems and methods are provided for a navigational route planning device that is more efficient and accurate than current low cost systems, without requiring the more expensive system resources. The systems and methods of the present invention offer an improved navigational route planning device which provides clear and concise guidance through decision points along a route by providing assistance that is more understandable, accurate and timely.

One aspect provided herein is an electronic navigational aid device with voice guidance. The device includes a processor and a memory adapted to communicate to the processor. The memory is adapted to store cartographic data and a route to a desired destination. The device processes travel along the route, recognizes when the device is approaching a decision point in the route, and provides voice guidance for the decision point.

According to one embodiment, the device provides an initial voice guidance for an upcoming decision point, an advance voice guidance within an advance guidance range for the upcoming decision point, and a confirmation voice guidance within a confirmation guidance range for the upcoming decision point. According to one embodiment, the advance voice guidance range is a time-based range and the confirmation guidance range is a distance-based range. According to one embodiment, the device provides a user-desired voice guidance in response to a user-requested prompt. The device is capable of keeping quiet when guidance is not needed such as, for example, when merging and passing through a decision point without exiting or turning.

These and other aspects, embodiments, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIGS. 3A–3C illustrate views for another embodiment of an electronic navigational device;

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to navigational systems and devices having voice guidance. One type of navigational system includes Global Positioning Systems (GPS). Such systems are known and have a variety of uses. In general, GPS is a satellite-based radio navigation system capable of determining continuous position and velocity information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1:
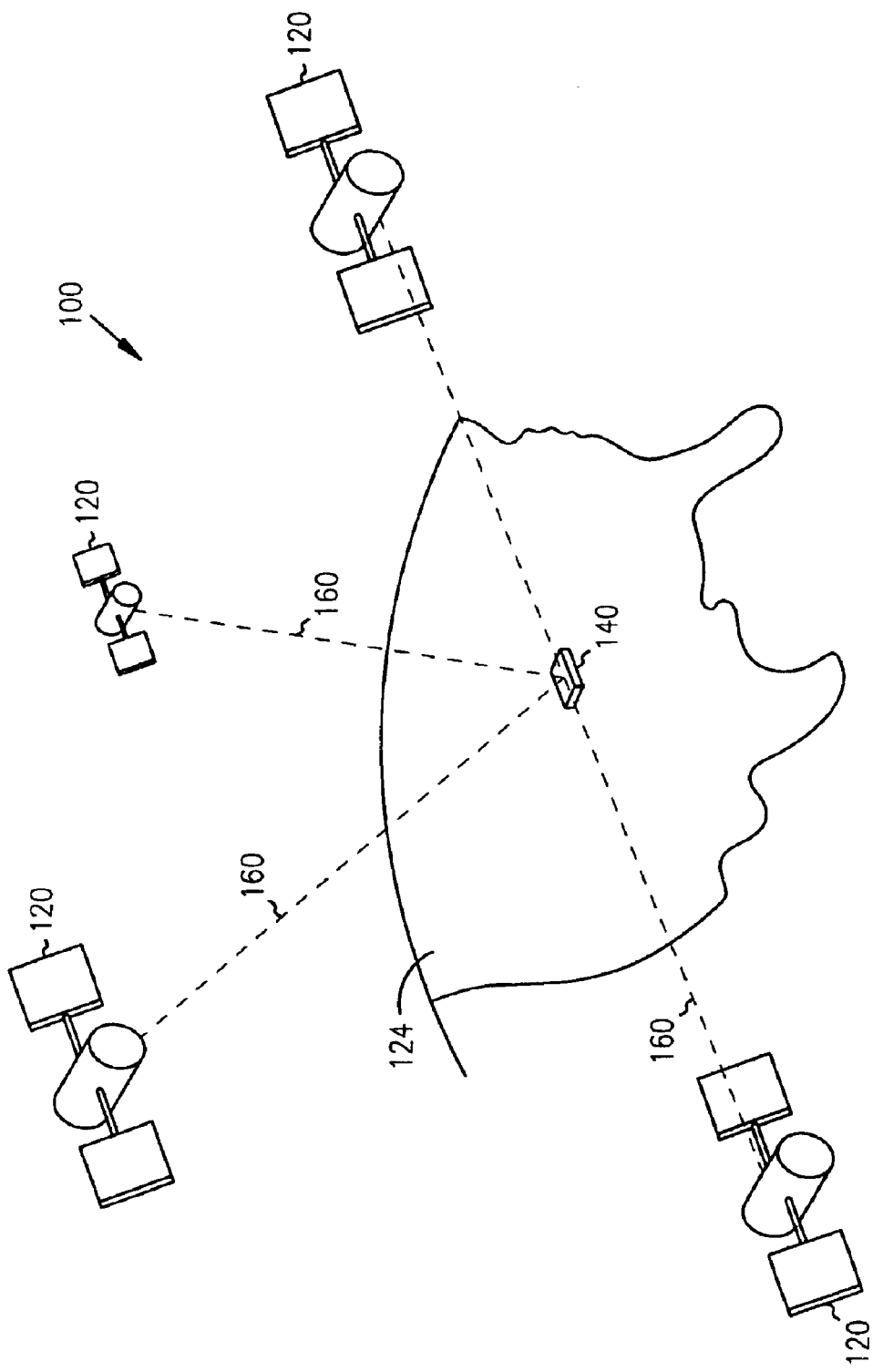
FIG. 1 is a representative view of a Global Positioning System (GPS)

FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

GPS satellites and GPS receiving devices are not required by the tenets of the present invention. Any receiving device capable of receiving the location from at least three transmitting locations is capable of performing basic triangulation calculations to determine the relative position of the receiving device with respect to the transmitting locations. For example, at least three cellular towers can each transmit their location information to a receiving cellular phone, or any other receiving device. The location of the cellular phone or device can be readily resolved if it is equipped to perform the triangulation algorithm. By further way of example, an amusement park or entertainment facility can deploy three or more transmitting radio frequency devices and provide users with receiving units capable of performing a triangulation algorithm to determine the receiving units location within the amusement park or entertainment facility. In this way, it is readily apparent that a receiving unit need not be exclusively GPS enabled to benefit from the teachings of the present invention.

Figure 2A:
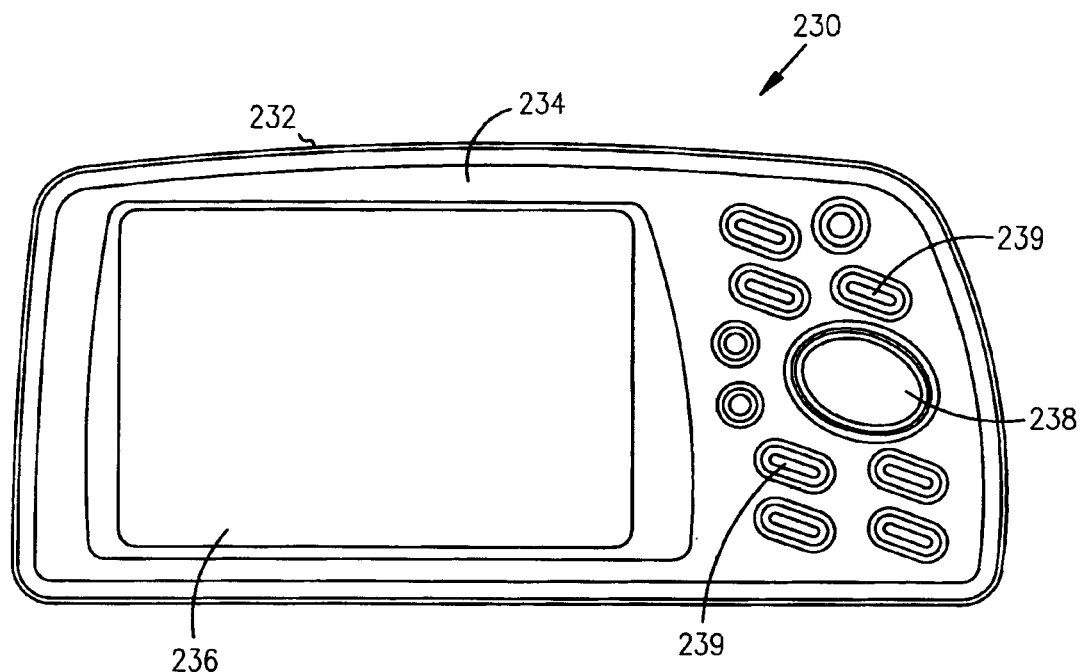
FIGS. 2A and 2B illustrate views for one embodiment of an electronic navigational device.
Figure 2B:
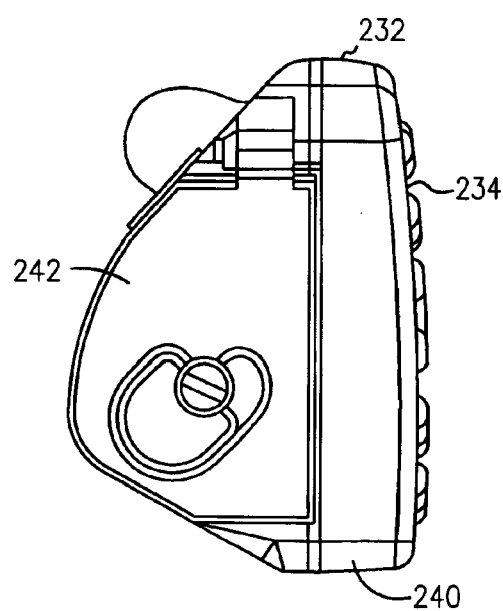

FIGS. 2A and 2B illustrate views for one embodiment of an electronic navigational device 230 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of separate molded pieces to form the device housing 232 and support input key pad 238, other individual keys 239, and display screen 236 in respective access slots shown in the control face 234 of FIG. 2A.

Figure 3C:
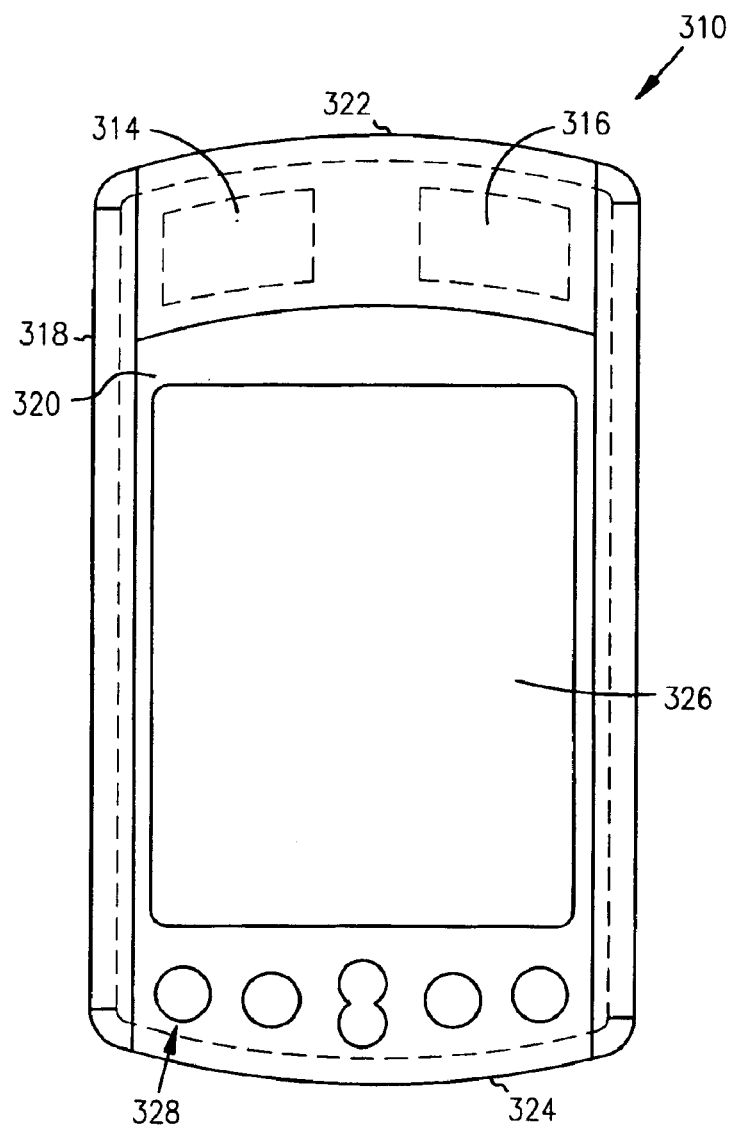
Figure 3C:
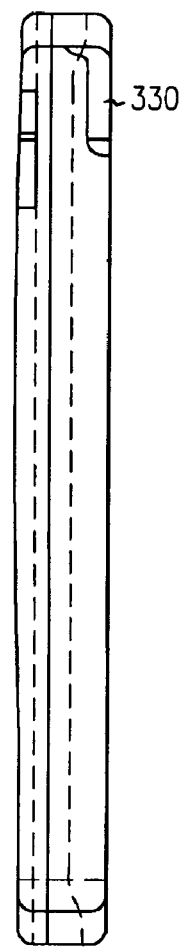
Figure 3C:
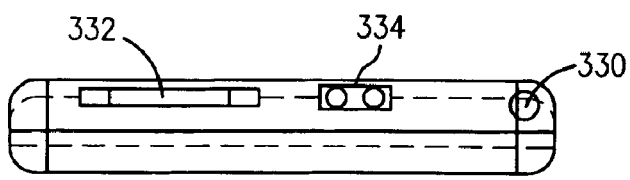

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
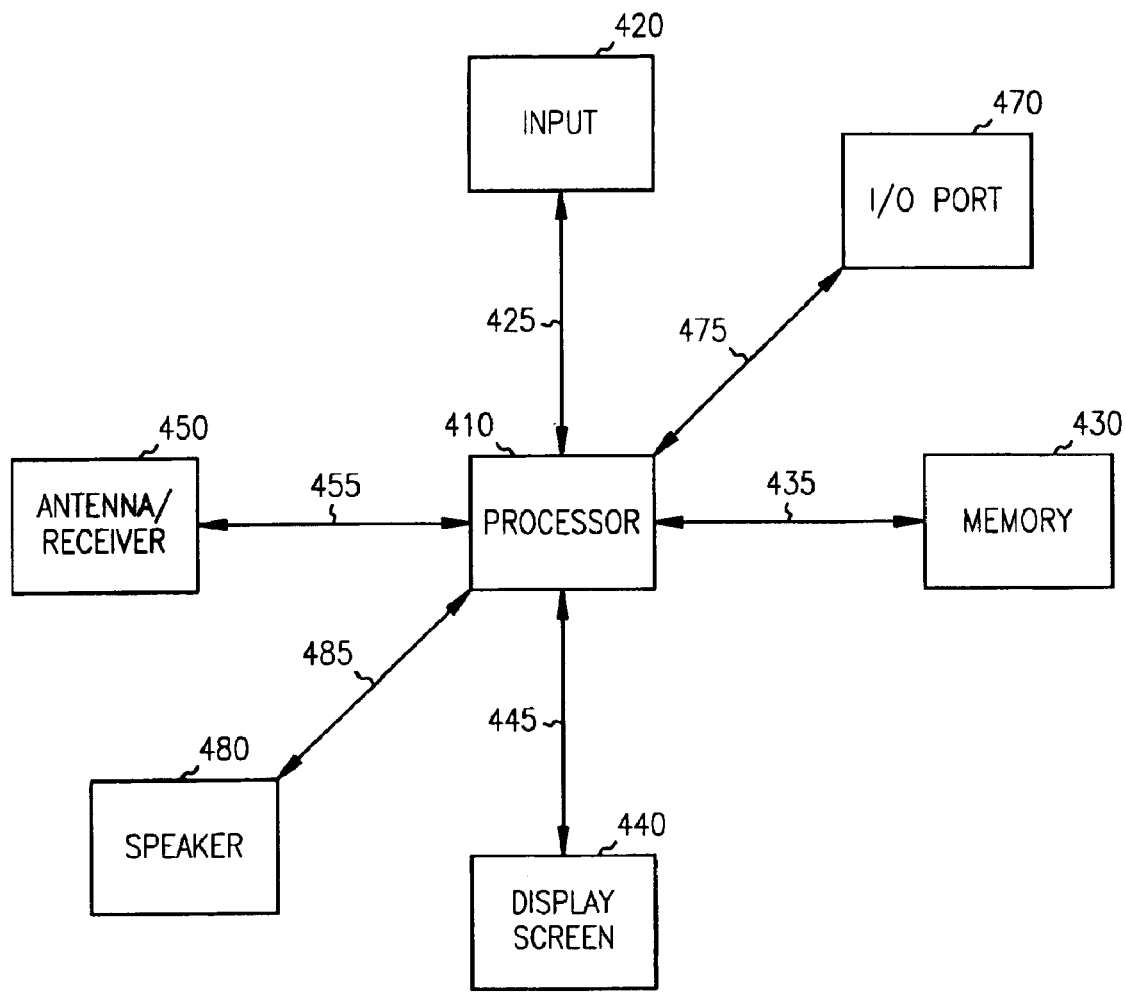
FIG. 4A is a block diagram of one embodiment for the electronic components within the hardware of FIGS. 2A–2B.

FIG. 4A is a block diagram of one embodiment for the electronic components within the hardware of FIGS. 2A–2B, such as within housing 332 and utilized by the electronic navigational device. In the embodiment shown in FIG. 4A, the electronic components include a processor 410 which is connected to an input 420, such as keypad via line 425. It will be understood that input 420 may alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components further include I/O ports 470 connected to processor 410 via line 475. According to one embodiment, a speaker 480 is connected to the processor 410 via line 485, and the device is adapted to provide the voice guidance through the speaker 480. According to one embodiment, the device is adapted to be connected to an auxiliary speaker, such as a speaker from a car stereo, earphones or an earpiece, and is adapted to provide the voice guidance through the auxiliary speaker.

Figure 4B:
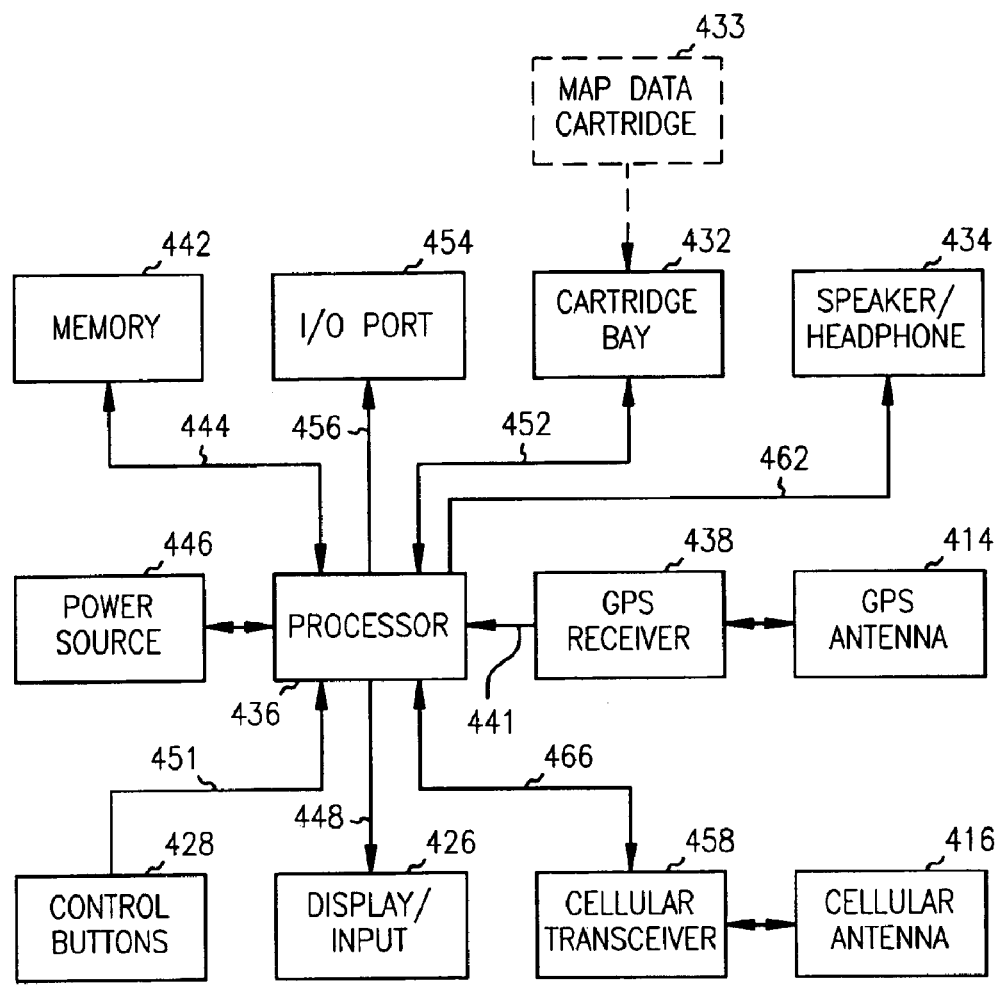
FIG. 4B is a block diagram of one embodiment for the electronic components within the hardware of FIGS. 3A–3C.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC) that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The PDA 310 may also include an infrared port (not shown) coupled to the processor 436 that may be used to beam information from one PDA to another.

As will be understood by one of ordinary skill in the art, the electronic components shown in FIGS. 4A and 4B are powered by a power source in a conventional manner. As will be understood by one of ordinary skill in the art, different configurations of the components shown in FIGS. 4A and 4B are considered within the scope of the present invention. For example, in one embodiment, the components shown in FIGS. 4A and 4B are in communication with one another via wireless connections and the like. Thus, the scope of the navigation device of the present invention includes a portable electronic navigational aid device.

According to the teachings of the present invention, the electronic components embodied in FIGS. 4A and 4B are adapted to provide an electronic navigational aid device with voice guidance to guide a user through a decision point with clear and concise prompts. That is, according to the teachings of the present invention a processor 410 is provided with the electronic navigational aid device. A memory 430 is connected to the processor. The memory 430 includes cartographic data and a route to a desired destination stored therein. The cartographic data includes data indicative of thoroughfares of a plurality of types. The processor 410 and memory 430 cooperate together to provide the voice guidance.

According to one embodiment, a speaker 480 is connected to the processor 410, and the device is adapted to provide the voice guidance through the speaker 480. According to one embodiment, the device is adapted to be connected to an auxiliary speaker, such as a speaker from a car stereo, earphones or an earpiece, and is adapted to provide the voice guidance through the auxiliary speaker.

According to one embodiment, a display 440 is connected to the processor 410 and is capable of displaying the cartographic data. The electronic navigational aid device processes travel along the route using a set of processing algorithms and the cartographic data stored in memory to operate on signals, e.g. GPS signals, received from the antenna/receiver 450 as the same will be known and understood by one of ordinary skill in the art upon reading this disclosure.

In one embodiment, in addition to providing voice guidance, the device provides a tone and/or visual warning to provide an indication of an approaching decision point. As one of ordinary skill in the art will understand upon reading this disclosure, the tone and/or visual indication can be adapted to suit the needs of a particular device implementation. In one embodiment, as described in more detail in copending, commonly assigned application Ser. No. 10/029,917, entitled "Navigation System, Method and Device with Automatic Next Turn Page," which was previously incorporated by reference herein, the device provides visual instructions to a user to increase the navigational assistance.

Using the processing algorithms of the present invention, the device processes travel along the route. Using the processing algorithms and the cartographic data and planned route stored in memory, the device recognizes when the device is approaching a decision point in the route and provides the voice guidance. According to the teachings of the present invention, the device incorporates these and other functions as will be explained in more detail below in connection with FIGS. 6–13.

Figure 5:
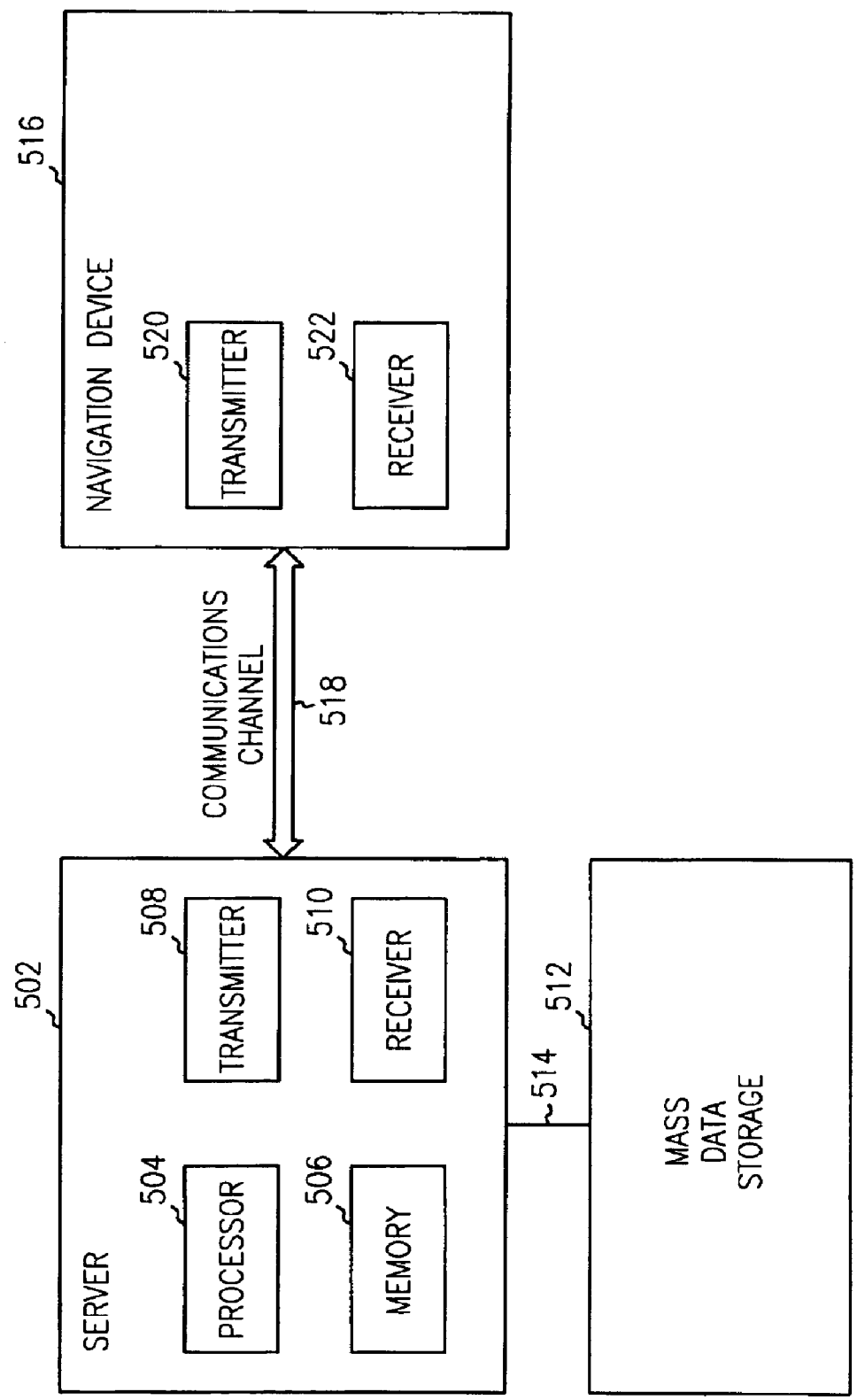
FIG. 5 is a block diagram of a navigation system according to the teachings of the present invention.

FIG. 5 is a block diagram of an embodiment of a navigation system which can be adapted to the teachings of the present invention. The navigation system includes a server 502. According to one embodiment, the server 502 includes a processor 504 operably coupled to memory 506, and further includes a transmitter 508 and a receiver 510 to send and receive data, communication, and/or other propagated signals. The transmitter 508 and receiver 510 are selected or designed according to the communication requirements and the communication technology used in the communication design for the navigation system. The functions of the transmitter 508 and the receiver 510 may be combined into a single transceiver.

The navigation system further includes a mass data storage 512 coupled to the server 502 via communication link 514. The mass data storage 512 contains a store of navigation data. One of ordinary skill in the art will understand, upon reading and comprehending this disclosure, that the mass data storage 512 can be separate device from the server 502 or can be incorporated into the server 502.

In one embodiment of the present invention, the navigation system further includes a navigation device 516 adapted to communicate with the server 502 through the communication channel 518. According to one embodiment, the navigation device 516 includes a processor and memory, as previously shown and described with respect to the block diagram of FIGS. 4A and 4B. Furthermore, the navigation device 516 includes a transmitter 520 and receiver 522 to send and receive communication signals through the communication channel 518. The transmitter 520 and receiver 522 are selected or designed according to the communication requirements and the communication technology used in the communication design for the navigation system. The functions of the transmitter 520 and receiver 522 may be combined into a single transceiver.

Software stored in the server memory 506 provides instructions for the processor 504 and allows the server 502 to provide services to the navigation device 516. One service provided by the server 502 involves processing requests from the navigation device 516 and transmitting navigation data from the mass data storage 512 to the navigation device 516. According to one embodiment, another service provided by the server 502 includes processing the navigation data using various algorithms for a desired application, and sending the results of these calculations to the navigation device 516.

The communication channel 518 is the propagating medium or path that connects the navigation device 516 and the server 502. According to one embodiment, both the server 502 and the navigation device 516 include a transmitter for transmitting data through the communication channel and a receiver for receiving data that has been transmitted through the communication channel.

The communication channel 518 is not limited to a particular communication technology. Additionally, the communication channel 518 is not limited to a single communication technology, that is, the channel 518 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 518 includes telephone and computer networks. Furthermore, in various embodiments, the communication channel 516 is capable of accommodating wireless communication such as radio frequency, microwave frequency and infrared communication, and the like. Additionally, according to various embodiments, the communication channel 516 accommodates satellite communication.

The communication signals transmitted through the communication channel 518 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like that are now known or hereinafter developed. Both digital and analog signals may be transmitted through the communication channel 518. According to various embodiments, these signals are modulated, encrypted and/or compressed signals as may be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory, such as now known or hereinafter developed.

According to one embodiment of the navigation system, the 502 server includes a remote server accessed by the navigation device 516 through a wireless channel. According to other embodiments of the navigation system, the server 502 includes a network server located on a local area network (LAN), wide area network (WAN), a virtual private network (VPN) and server farms.

According to another embodiment of the navigation system, the server 502 includes a personal computer such as a desktop or laptop computer. In one embodiment, the communication channel 518 is a cable connected between the personal computer and the navigation device. According to one embodiment, the communication channel 518 is a wireless connection between the personal computer and the navigation device 516.

FIG. 5 presents yet another embodiment for a collective set of electronic components adapted to the present invention. As one of ordinary skill in the art will understand upon reading and comprehending this disclosure the navigation system of FIG. 5 is adapted to the present invention in a manner distinguishable from that described and explained in detail in connection with FIGS. 4A and 4B.

That is, the navigational system 500 of FIG. 5 is likewise adapted to provide an electronic navigational aid device 516 with instructional aids to assist in negotiating a course through a decision point in a route. In this embodiment, the processor 504 in the server 502 is used to handle the bulk of the system's processing needs. And as one of ordinary skill in the art will understand the mass storage device 512 connected to the server can include volumes more cartographic and route data than that which is able to be maintained on the navigational device 516 itself. In this embodiment, the server 502 processes the majority of a device's travel along the route using a set of processing algorithms and the cartographic and route data stored in memory 512 and can operate on signals, e.g. GPS signals, originally received by the navigational device 516. Similar to the navigational device of FIGS. 4A and 4B, one embodiment of the navigation device 516 in system 500 is outfitted with GPS capabilities, a display and a speaker.

As described and explained in detail in connection with FIGS. 4A and 4B, the navigation system of FIG. 5 uses processing algorithms to process travel along a route. The processor 504 operates on algorithms and the cartographic data and planned route stored in memory 506. Using the novel processing algorithms and the cartographic data and planned route stored in memory 506, the device recognizes when the device is approaching a decision point in the route and provides voice guidance to clearly and concisely guide a user through the decision point. According to the teachings of the present invention, the device incorporates these and other functions as will be explained in more detail below in connection with FIGS. 6–13. As one of ordinary skill in the art will understand upon reading and comprehending this disclosure, a user of the navigation device 516 can be proximate to or accompanying the navigation device 516. The invention however, is not so limited. The navigation device 516 of the present invention includes a portable electronic navigational aid device.

The features and functionality explained and described in detail above in connection with the device of FIGS. 4A and 4B are likewise available in the system 500 of FIG. 5. That is, as will be explained in more detail below, in one embodiment the navigation device 516 further provides additional audio and visual cues to aid the navigation along the route.

Figure 6:
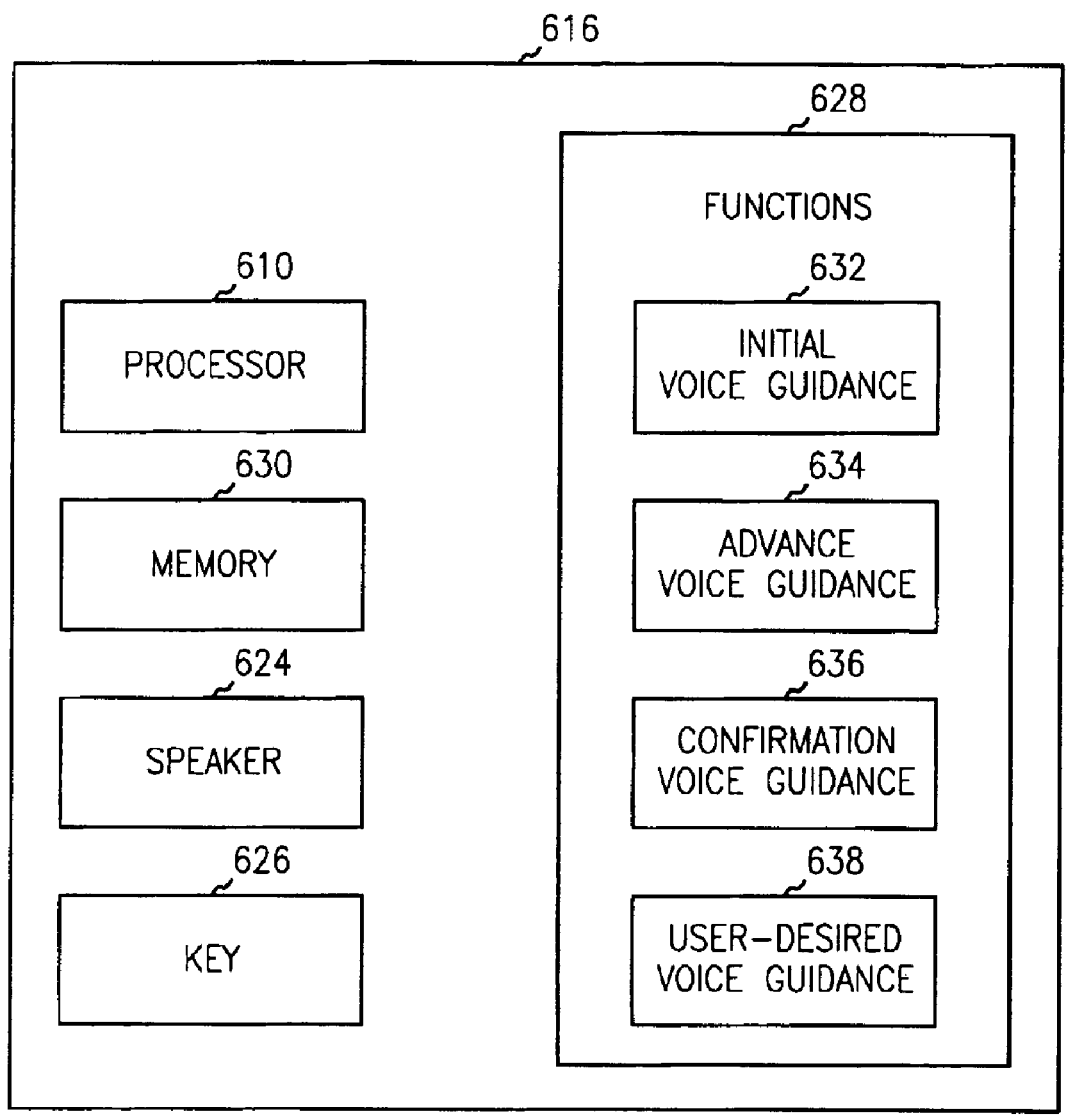
FIG. 6 is a block diagram of components of the electronic navigation device embodiment and voice guidance functions associated therewith.

FIG. 6 is a block diagram of components of the electronic navigation device embodiment and voice guidance functions associated therewith. According to one embodiment, the navigation device 616 includes a processor 610 and memory 630, as previously shown and described with respect to the block diagram of FIGS. 4A and 4B. One of ordinary skill in the art will understand, upon reading and comprehending this disclosure, that other components, including but not limited to those shown in the block diagram of FIGS. 4A and 4B, may be contained in the electronic navigation device 616.

According to various embodiments, the illustrated electronic navigation device of FIG. 6 includes a speaker 624 and a key 626. The speaker 624 is operably connected to the processor, and provides a mechanism for providing voice guidance. The invention is not so limited. In various other embodiments, the navigation device 616 itself does not include a speaker 624, but rather is connected to external or auxiliary speakers. For example, in various embodiments, the navigation device 616 is connected to headphones, earpieces, automobile stereo equipment and the like. The key 626 functions as an actuator or switch. According to some embodiments, the key 626 is implemented as a physical switch. According to other embodiments, the key 626 is implemented as a virtual switch; that is, is implemented through software or executable instructions operated on by the processor 610. According to one embodiment, a user actuates the key 626 to obtain voice guidance whenever such guidance is desired.

The processor 610, memory 630, speaker 624 and key 626 are operably connected to provide one or more voice guidance functions 628 during navigation through a route. According to one embodiment, the device 616 provides an initial voice guidance 632 for an upcoming decision point, an advance voice guidance 634 within an advance guidance time range for the upcoming decision point, a confirmation voice guidance 636 within a confirmation guidance distance range for the upcoming decision point, and a user-desired voice guidance 638 in response to a user-requested prompt. Various embodiments of the navigation device 616 include one, or various combinations, of the voice guidance functions 632, 634, 636 and 638.

Figure 7:
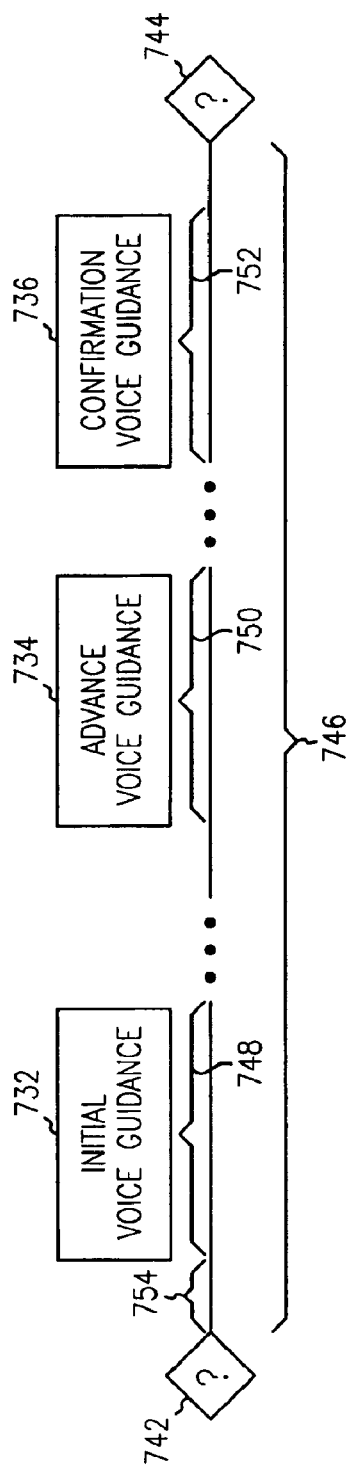
FIG. 7 is a block diagram of voice guidance provided for a route between two decision points.

FIG. 7 is a block diagram of voice guidance provided for a route between two decision points. A first decision point is at 742 and a second decision point is at 744. These decision points 742 and 744 represent intersections, nodes or points where a user, such as a driver, must make a decision to stay on route. According to one embodiment, these decision points 742 and 744 do not represent points where the decision is obvious.

One example of an obvious decision is a Continue maneuver to continue on a road. According to one embodiment, the navigation device assumes that a user will continue on a road until instructed otherwise. The amount of voice guidance required to instruct the driver to continue at each intersection is not necessary, and in fact would likely become tiresome or annoying. Another example of an obvious decision is a merge decision. One of ordinary skill in the art will understand upon studying this disclosure that other decisions are capable of being classified as obvious decisions for which voice guidance is not required.

The portion of the route between the two decision points 742 and 744 is termed a route leg 746. The route leg may be as small or as large as is capable of being handled by the navigation system. According to one embodiment, when the route leg is large enough, an initial voice guidance 732 is provided during an initial voice guidance range 748, an advance voice guidance 734 is provided during an advance voice guidance range 750, and a confirmation voice guidance 736 is provided during a confirmation voice guidance range 752. In one embodiment, the initial voice guidance range 748 is a range based on the previous decision point such that voice guidance is provided after a predetermined period of time or a predetermined distance after the previous decision point is successfully navigated. According to one embodiment, the advance voice guidance range 750 is a time-based range and the confirmation voice guidance range 752 is a distance-based range.

The initial voice guidance 732 provides a user with an awareness of the situation. That is, a decision 742 recently has been made, and the initial voice guidance 732 indicates how long it will be before another decision has to be made. For example, an initial voice guidance 732 may state "Drive South on Interstate 35 one hundred miles to Des Moines," or may state "Drive North on Highway 77 four miles to Highway 62." In the first instance, a user becomes aware that a decision does not have to be made for one hundred miles, and in the second instance, a user becomes aware that a decision will be made in four miles. By becoming aware of the situation, the user is free to drive on the road without being concerned about missing an exit, turn or other decision point. According to one embodiment, the initial voice guidance range 748 occurs after a predetermined delay 754 after the first decision point 742. The progress of the navigation device along the route is monitored, and as soon as it is determined that the maneuver is complete, i.e. that the decision point 742 has been navigated, the initial voice guidance 732 is provided after a predetermined delay 754. According to one embodiment, this delay 754 is on the order of three seconds. One of ordinary skill in the art will appreciate that other timing is available for providing the initial voice guidance 732.

The advance voice guidance 734 provides an indication to the user that a decision point 744 is approaching. The advance voice guidance range 750 occurs early enough with respect to a time-based reference, or far enough with respect to a distance-based reference, to change lanes or otherwise become ready to safely navigate through the decision point 744.

A set of criteria is used to determine the timing of the advance voice guidance 734. This criteria include, but are not limited to, the proximity of the device with respect to the decision point 744 and the speed at which the device is approaching the decision point. For example, in one embodiment of the invention, the device provides advance voice guidance 734 at some predetermined time window before the device reaches the decision point, e.g. 30–90 seconds before the device reaches the decision point. In the invention, the device determines this time window based on a set of criteria such as a classification of the thoroughfare on which the device is traveling, a speed classification of the thoroughfare on which the device is traveling, and a current travel speed of the device.

To further explain, in one embodiment, the device analyzes or assesses the speed classification of the thoroughfare on which the device is traveling and a current travel speed of the device to determine the point in time in advance of the decision point 744 to provide the advance voice guidance 734. Thus, for example, if the device is traveling on a major interstate at a high rate of speed, then the device will provide the advance voice guidance 734 at a time approximated to be about 90 seconds in advance of reaching the decision point in order to provide enough advance warning to negotiate a course through the decision point 744. Alternatively, if the device is traveling on a minor thoroughfare at a low rate of speed, then the device will provide the advance voice guidance for the next decision point at a time approximately 30 seconds in advance of reaching the decision point, again in order to provide enough advance warning to negotiate a course through the decision point yet still be proximate enough in time to the decision point to provide the most effective navigation assistance.

According to various embodiments, the functions of one or more of the voice guidance 732, 734 and 736 may be combined as appropriate for various types of route legs 746. For example, a route leg 746 may be too short to provide all three voice guidance prompts 732, 734 and 736. In this situation, the function of the initial voice guidance 732 and the advance voice guidance 734 may be combined into one voice guidance prompt that serves to provide a situation of awareness after the decision point 742, but that also provides sufficient information regarding the upcoming decision point 744 to safely navigate through the decision point. In other words, instead of having three voice guidance prompts, a route leg may only have one or two voice guidance prompts with the appropriate detail to navigate through the upcoming decision point.

Figure 8:
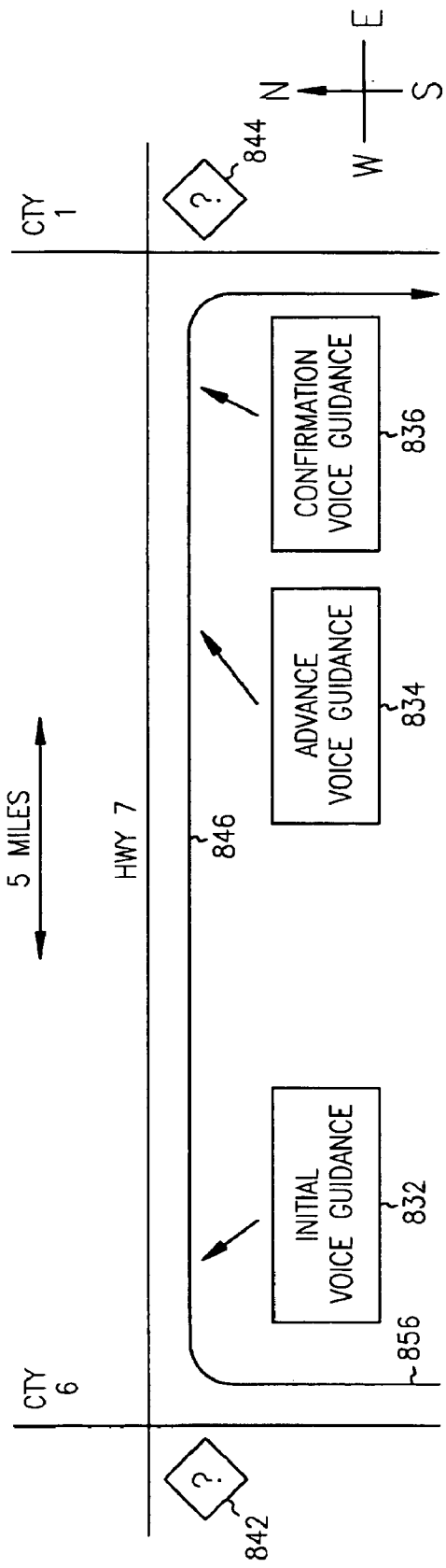
FIG. 8 is one example of voice guidance with respect to a route on rural highways.

FIG. 8 is one example of voice guidance with respect to a route on rural highways. This example includes State Highway 7 intersected by County Roads 6 and 1. A route 856 is planned to travel North on County Road 6, to turn right and travel East on State Highway 7 for five miles, and then to turn right and travel South on County Road 1. The illustrated portion of the route includes two decision points 842 and 844 at the two intersections, and a route leg 846 between the two intersections.

An initial voice guidance 832 is provided after a short delay after turning onto Highway 7. The initial voice guidance, for example, may state "Travel 5 miles to County Road 1." An advance voice guidance 834 is provided between 30 to 90 seconds (about one-half mile to about one mile) prior to reaching the intersection of State Highway 7 and County Road 1. This advance voice guidance notifies the user of an upcoming decision. The advance voice guidance, for example, may state "Travel 0.5 miles to Country Road 1, then turn right." A confirmation voice guidance 836 is provided just prior to making the turn at the decision point. The confirmation voice guidance, for example, may simply state "Turn right" or "Turn right onto County Road 1."

Figure 9:
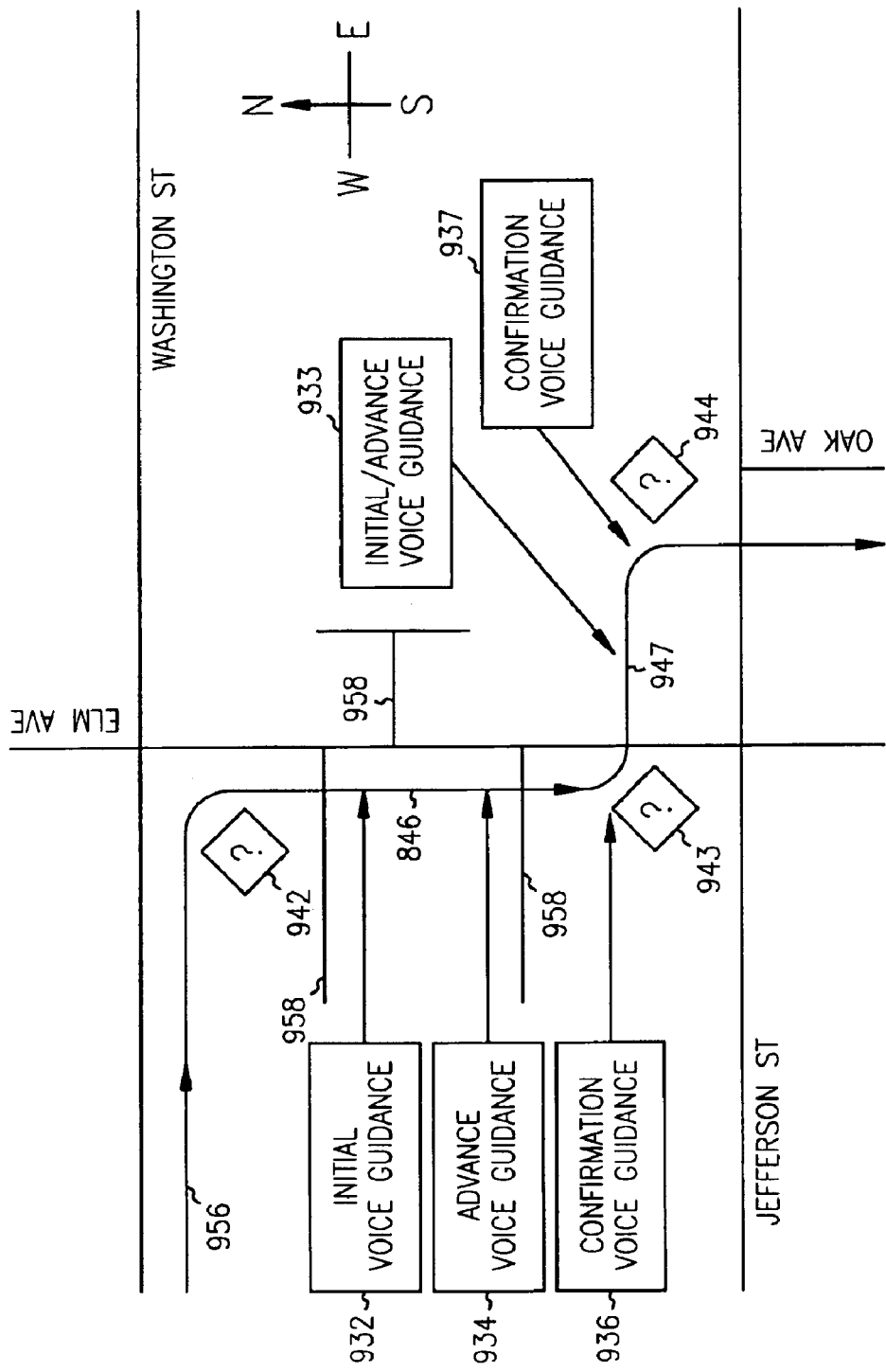
FIG. 9 is one example of voice guidance with respect to a route on city streets.

FIG. 9 is one example of voice guidance with respect to a route on city streets. This example includes Washington Street and Jefferson Street intersected by Elm Avenue. This example further includes Oak Avenue, which forms an intersection with Jefferson Street. Additionally, a number of dead-end, cul-de-sac residential roads 958 intersect Elm Avenue.

A route 956 is planned to travel East on Washington Street, to turn right and travel South on Elm Avenue, to turn left and travel East on Jefferson Street, and to turn right and travel South on Oak Avenue. The illustrated portion of the route includes three decision points 942, 943 and 944 and two route legs 946 and 947.

An initial voice guidance 932 is provided after a short delay after navigating through the decision point 942 by turning onto Elm Avenue. The initial voice guidance, for example, may state "Travel 0.5 miles to Jefferson Street." Thus, a user is informed abut the situation, and is not concerned about whether or not to turn on the cul-de-sac roads 958. An advance voice guidance 934 is provided between 30 to 90 seconds (about two or three blocks) prior to reaching the decision point 943 at the intersection of Elm Avenue and Jefferson Street. This advance voice guidance notifies the user of an upcoming decision 943. The advance voice guidance, for example, may state "Travel 0.2 miles to Jefferson Street, then turn left." A confirmation voice guidance 936 is provided just prior to making the turn at the decision point 943. The confirmation voice guidance, for example, may simply state "Turn left" or "Turn left onto Jefferson Street."

In this example, the successive decision points 943 and 944 are close together such that there is not time to provide three voice guidance prompts, nor is it necessary to provide three voice guidance prompts. In this situation, the function of the initial voice guidance and the advance voice guidance are essentially combined. That is, in this leg 847, the first voice guidance 933, referred to as the initial/advance voice guidance, both provides situation awareness and notifies a user of an upcoming decision point with sufficient information to safely navigate through the decision point. For example, an initial/advance voice guidance 933 is provided after a short delay after navigating through the decision point 943 by turning left onto Jefferson Street Avenue. The initial/advance voice guidance 933, for example, may state "Travel 800 feet to Oak Avenue, then turn right." Thus, for this route leg 947, a combined initial/advance voice guidance is provided. A confirmation voice guidance 937 is provided just prior to making the turn at the decision point 944. The confirmation voice guidance 937, for example, may simply state "Turn right" or "Turn right onto Oak Avenue."

Figure 10:
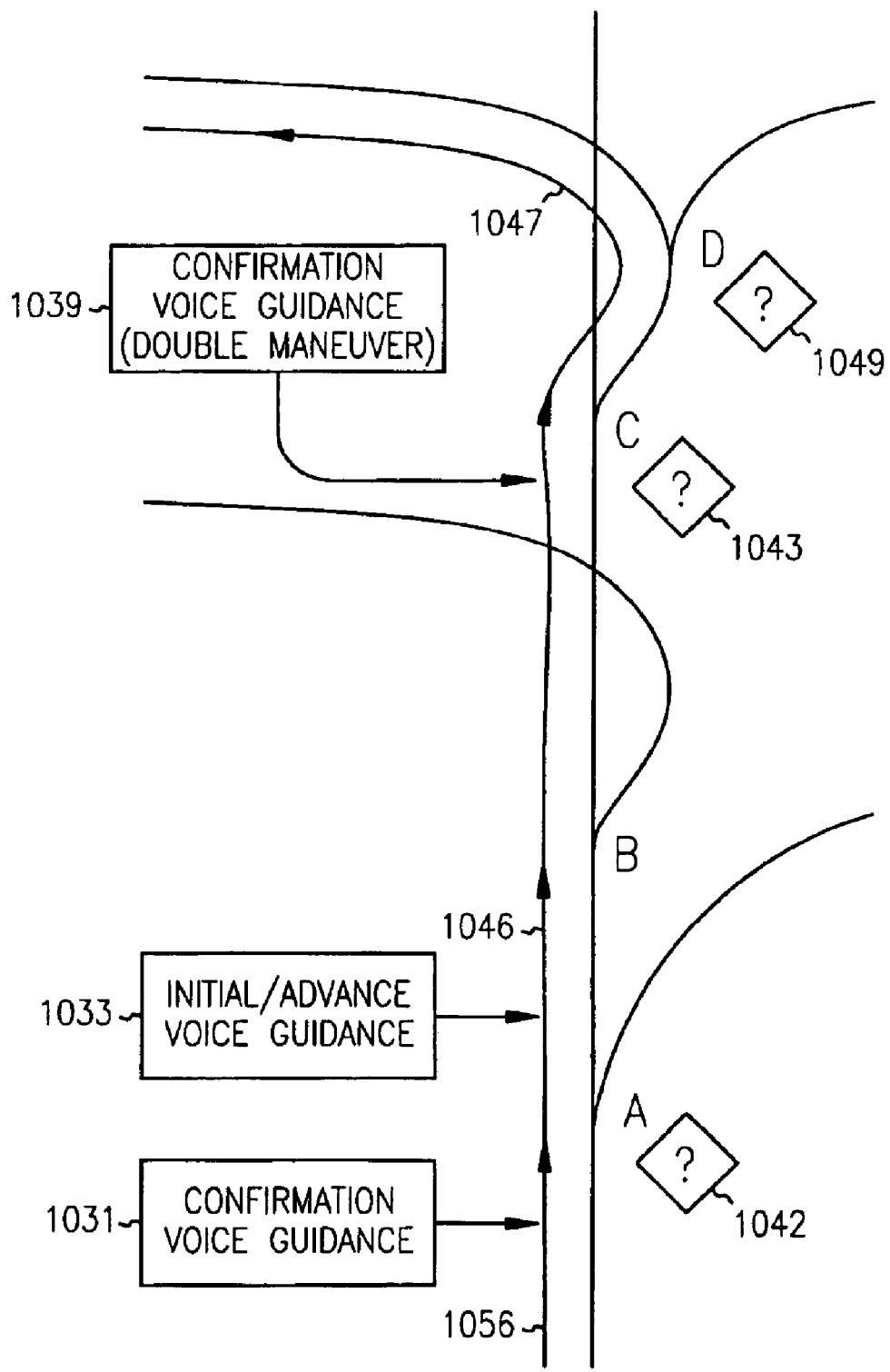
FIG. 10 is one example of voice guidance with respect to a route on a high classification road with a number of decision points.

FIG. 10 is one example of voice guidance with respect to a route on a high classification road with a number of decision points. Point A represents a split in a freeway, point B represents an off ramp onto another freeway, point C represents an off ramp to city streets, and point D represents a split in the ramp to exit in different directions onto the city streets. A route 1056 is planned to take the left split, or stay left, at point A, to continue on the road past point B, to take the off-ramp at point C and to take the left split at point D. The illustrated portion of the route includes three decision points 1042, 1043 and 1044 and two route legs 1046 and 1047 that span between decision points. It is noted that point B does not represent a decision point because it is assumed that the user will continue on the road unless otherwise told. In contrast, when the road splits as it does at point A and point D, an obvious Continue maneuver does not exist. As such points A and D represent decision points 1042 and 1044, respectively, along with the decision point 1043 for taking the ramp at point C.

In this example, a confirmation voice guidance 1031 is provided for the decision point 1042. This confirmation voice guidance 1031, for example, may state "Stay left." At 1033, a first voice guidance is provided for the next leg 1046. This voice guidance occurs within the advance guidance range, and thus forms an initial/advance voice guidance prompt. This initial/advance voice guidance 1033, for example, may state "Exit right in 1.5 miles." At 1039, a confirmation voice guidance is provided to confirm the maneuver to exit right at point C. Since the decision point 1044 occurs soon after the decision point 1043, the confirmation voice guidance 1037 provides instructions to navigate through both decision points 1043 and 1044; i.e. to perform a double maneuver. For example, the confirmation voice guidance may state "Exit right, then stay left." According to one embodiment, a double maneuver guidance is provided when the distance and/or time between successive decision points is within a predetermined distance and/or time. According to one embodiment, double maneuver guidance is performed when the distance between the two decision points is approximately 150% of the confirmation distance of the second maneuver. The confirmation distance is a point within the confirmation guidance distance range in which voice guidance is provided for the second maneuver. The confirmation distance is determined based on the speed category of the road, if speed category data is available. Otherwise, the confirmation distance is determined by the classification of the road. Examples of road classifications include, but are not limited to, residential roads, collector roads, arterial roads, highways, and interstates highways.

Figure 11:
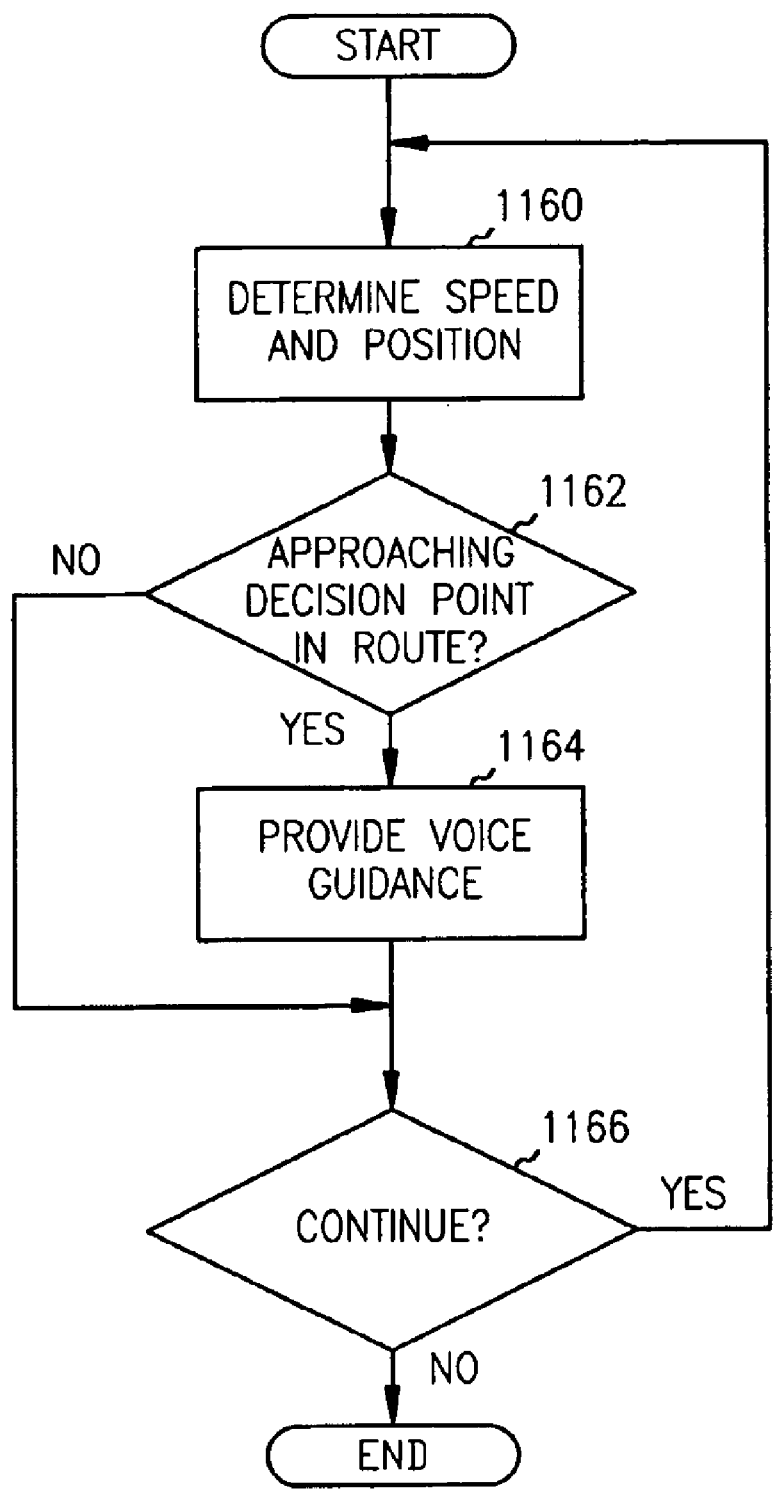
FIG. 11 is a flow diagram of one embodiment of a navigational aid method according to the teachings of the present invention.

FIG. 11 is a flow diagram of one embodiment of a navigational aid method according to the teachings of the present invention. The navigation aid method includes a method for providing voice guidance with respect to a navigation device or navigation system as described and explained in detail above in connection with FIGS. 4 and 5. And, as described above, a processor is used for processing signals which include input data from input devices, e.g. keypads or other input keys, GPS signals from GPS components, and data received from I/O ports in order to perform the methods described herein. As shown in FIG. 11, the navigation aid method for providing voice guidance includes calculating or determining the device's current travel speed and position at block 1160. In one embodiment, determining the device's current travel speed and position includes using a global positioning system. At 1162, it is determined whether the device is approaching a decision point in the route. The device may, for example, be within an initial guidance range, an advance guidance range, or a confirmation guidance range. If a decision point is being approached, the process proceeds to 1164 where voice guidance is provided. If the device is not approaching a decision point, or is not within a voice guidance range, the process does not provide voice guidance. It is determined at 1166 whether to terminate or continue the process. Upon determining to continue the process, the speed and position of the device is determined again at 1160, and the process continues.

In one embodiment, the device or system operates on data indicative of a set of travel habits on each of the plurality of types of thoroughfares and stores the travel habit data in memory. In one embodiment of the present invention, the travel habit data includes data relating to the historical travel speed of the device on a particular thoroughfare. Such information is useful, for example, to estimate travel times. In the invention, the device's current position is determined at regular intervals. According to one embodiment, the device's current position is determined at update events that occur at approximately one second intervals. As such, it can be characterized that the device's current position is determined continuously. The display provides the device's position and uses audio instructions to navigate through decision points along the route. Again, in one embodiment, the device monitors and provides the device's current travel speed and location using a global positioning system.

The device of the present invention includes a portable electronic navigational aid device. In one embodiment, the portable electronic navigation aid device includes a portable vehicle, or automobile navigation device, a navigational device for marine craft, aircraft, portable handheld units, and others of the like.

Figure 12:
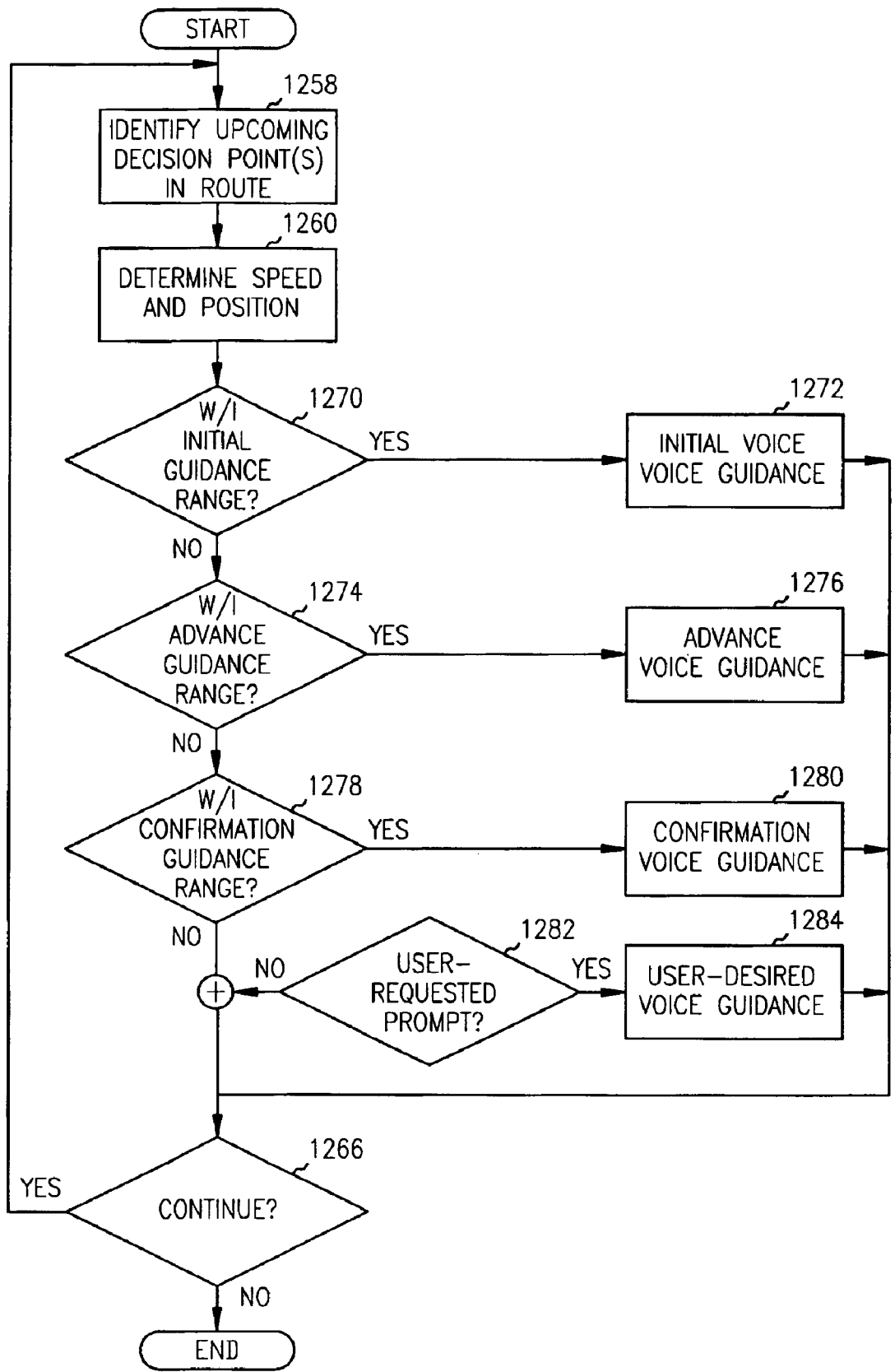
FIG. 12 is a flow diagram of another embodiment of a navigational aid method according to the teachings of the present invention.

FIG. 12 is a flow diagram of another embodiment of a navigational aid method according to the teachings of the present invention. According to this embodiment, the upcoming decision point or points in the route are determined or otherwise identified at 1258. According to one embodiment, at least two upcoming decision points are identified or considered to determine if the upcoming maneuvers qualify as a double maneuver. According to one embodiment, a double maneuver is a maneuver that navigates through two decision points that occur within approximately 150% of the confirmation distance of the second maneuver. As stated earlier, this confirmation distance is capable of being varied based on a speed classification or road classification. At 1260, the speed and position of a navigational aid device is determined.

At 1270, it is determined whether the device is within an initial guidance range. Upon determining that the device is within an initial guidance range, an initial voice guidance is provided at 1272. At 1274, it is determined whether the device is within an advance guidance range. Upon determining that the device is within an advance guidance range, an advance guidance is provided at 1276. At 1278, it is determined whether the device is within a confirmation guidance range. Upon determining that the device is within a confirmation range, a confirmation voice guidance is provided at 1280. At 1282, it is determined whether a user-requested prompt has occurred. Upon determining that a user-requested prompt has occurred, a user-desired voice guidance is provided at 1284. Thus, because of the user-desired voice prompt, voice guidance is available even if the device is not within the initial guidance range, the advance guidance range, or the confirmation guidance range. Upon determining that the process is to continue at 1266, the process proceeds to 1258 to again identify the upcoming point(s) in the route and to determine the speed and position of the navigation device.

One of ordinary skill in the art will understand, upon reading and comprehending this disclosure, that the order of above-identified determinations, as well as the order of the above-identified processes, may vary. Additionally, one or more of the various combinations of determinations 1270, 1274, 1278 and 1282 may be used in the process. Additionally, functions associated with the voice guidance 1272, 1276, 1280 and 1284 may be combined to provide appropriate guidance for a particular route leg.

That is, as one of ordinary skill in the art will understand upon reading and comprehending this disclosure, any one or more of the above features can be combined into a particular embodiment of the invention. Likewise, in the invention any one or a combination of the above functions can be optionally de-activated in the device. One of ordinary skill in the art will further understand that the method includes using a computer accessible medium having a set of computer executable instructions operable to perform the method. Other embodiments may be utilized and structural, logical, and electrical changes may be made without departing from the scope of the present invention.

Figure 13:
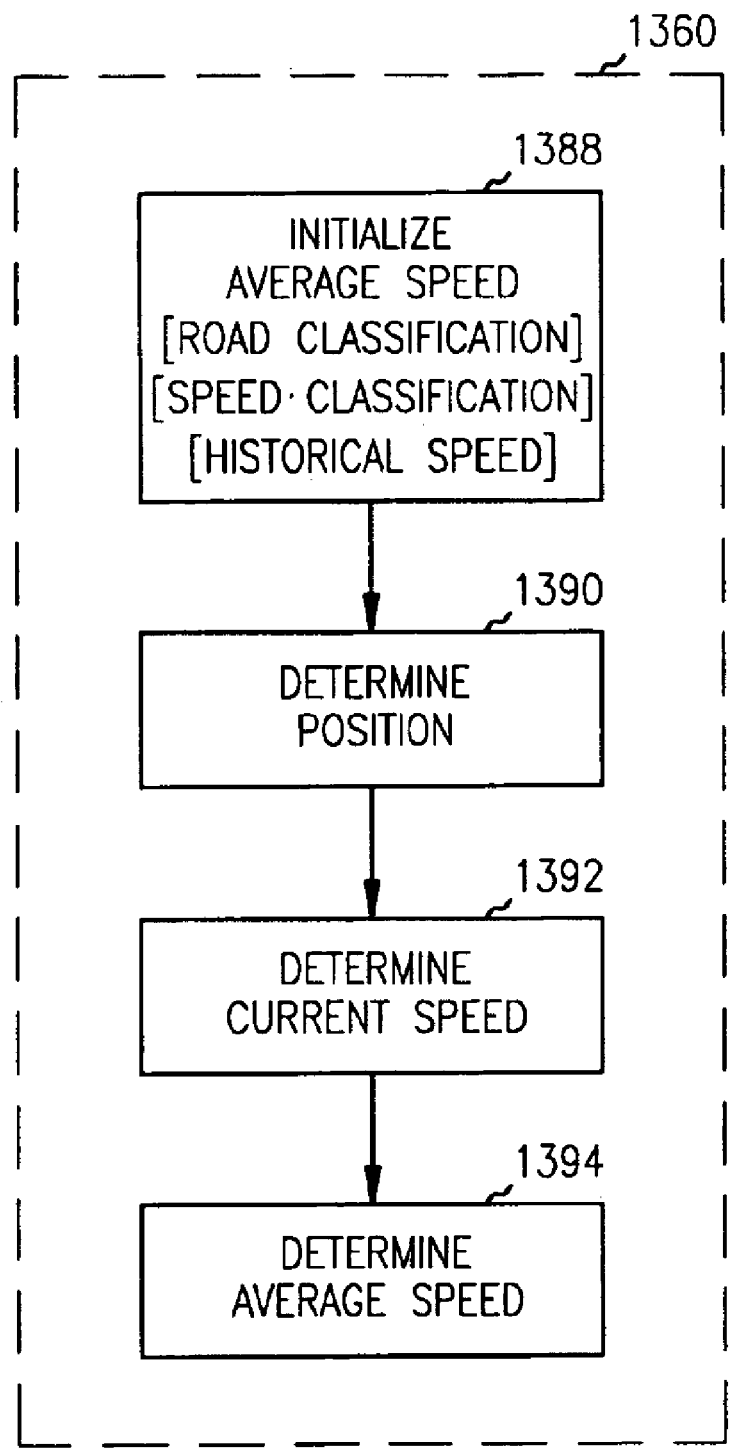
FIG. 13 is a flow diagram of one embodiment for determining speed and position as shown in the flow diagrams of FIGS. 11 and 12.

FIG. 13 is a flow diagram of one embodiment for determining speed and position 1360 as shown in the flow diagrams of FIGS. 11 and 12. According to this embodiment, the average speed of the navigational aid device is initialized at 1388. According to one embodiment, initializing the average speed occurs only once for a route leg at the beginning of the route leg. According to various embodiments, a number of factors may be used to initialize average speed, including one or more of the following: the road classification for a thoroughfare, the speed classification for a thoroughfare, and a historical speed of the device on the same and/or similar thoroughfares. By initializing the average speed at the beginning of a route leg, the average speed is biased closer to the estimated final average speed for the route leg. Otherwise, the average speed would provide too much weight to the slower speeds that occur before acceleration at the beginning of a route leg.

The position of the navigational aid device is determined at 1390. The current speed is determined at 1392. The process proceeds to 1394 where the average speed is determined based on the initialized average speed as determined at 1388 and the current speed as determined at 1394. The initialized average speed is a larger factor in determining average speed at the beginning of a route length than toward the end of route leg. Thus, the time required to accelerate up to speed does not exaggerate the average speed and the calculations based on the average speed.

In some embodiments, the methods provided above are implemented as a computer data signal embodied in a carrier wave or propagated signal, that represents a sequence of instructions which, when executed by a processor, such as processor 410 in FIG. 4A, processor 436 in FIG. 4B or processor 504 in FIG. 5, cause the processor to perform the respective method. In other embodiments, methods provided above are implemented as a set of instructions contained on a computer-accessible medium, such as memory 430 in FIG. 4A, memory 442 in FIG. 4B or mass storage device 512 in FIG. 5, capable of directing a processor, such as processor 410 in FIG. 4A, processor 436 in FIG. 4B or processor 504 in FIG. 5, to perform the respective method. In varying embodiments, the medium is a magnetic medium, an electronic medium, or an optical medium.

As one of ordinary skill in the art will understand upon reading this disclosure, the electronic components of device shown in FIGS. 4A and 4B, and components of the system shown in FIG. 5 can be embodied as computer hardware circuitry or as a computer-readable program, or a combination of both. In another embodiment, system 500 is implemented in an application service provider (ASP) system.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to improving accuracy, processor speed and ease of user interaction with a navigation device. That is, the systems, devices and methods provide for a navigational route planning device which is more efficient and accurate than current low cost systems, without requiring the more expensive system resources. The systems, devices and methods of the present invention offer an improved navigational route planning device which provides clear and concise voice guidance through decision points along a route by providing assistance that is more understandable, accurate and timely.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. An electronic navigational aid device with voice guidance, comprising:
   a processor;
   a memory adapted to communicate to the processor, the memory being adapted to store cartographic data and a route to a desired destination;
   wherein the device is adapted to process travel along the route,
   wherein the device is adapted to recognize when the device is approaching a decision point in the route, and
   wherein the device is adapted to provide voice guidance for the decision point and to recognize a user-requested prompt for voice guidance.

2. The device of claim 1, further comprising a speaker, wherein the device is adapted to provide voice guidance for the decision point through the speaker.

3. The device of claim 1, wherein the device is adapted to recognize when the device is within an initial guidance range from a previous decision point in the route and to perform a corresponding initial voice guidance for the approaching decision point.

4. The device of claim 1, wherein the device is adapted to recognize when the device is within an advance guidance range for the decision point in the route and to perform a corresponding advance voice guidance.

5. The device of claim 1, wherein the device is adapted to recognize when the device is within a confirmation guidance range for the decision point in the route and to perform a corresponding confirmation voice guidance.

6. The device of claim 1, wherein the device is adapted to provide an initial voice guidance for the decision point within an initial guidance range from a previous decision point in the route, an advance voice guidance for the decision point within an advance guidance range from the decision point, and a confirmation voice guidance for the decision point within a confirmation guidance range from the decision point, wherein the initial voice guidance, the advance voice guidance and the confirmation voice guidance provide different prompts to provide specific guidance when the decision point is within the initial guidance range, within the advance guidance range, and within the confirmation voice guidance range.

7. The device of claim 1, wherein:
   the device is adapted to recognize when the device is approaching a first decision point and a second decision point in the route;
   the device is adapted to recognize when the second decision point is within a predetermined range of the first decision point; and
   the device is adapted to provide voice guidance for both the first decision point and the second decision point prior to reaching the first decision point.

8. The device of claim 7, wherein the predetermined range is approximately 150% of a confirmation distance in a confirmation guidance range for the second decision point.

9. The device of claim 1, wherein the electronic navigational aid device with voice guidance comprises a portable electronic navigational aid device.

10. The device of claim 9, wherein the portable electronic navigational aid device includes a personal digital assistant (PDA).

11. The device of claim 9, wherein the portable electronic navigational aid device includes a wireless communication device.

12. A navigation system, comprising:
   a mass data storage adapted to store navigation data from which a route can be determined;
   a server adapted to communicate with the mass data storage; and
   a navigation device adapted to communicate with and retrieve navigation data from the server via a communication channel,
   wherein the system is adapted to process travel along the route, determine a current travel speed and a current position for the navigation device, recognize when the device is approaching a decision point in the route, provide voice guidance for navigating through the decision point and continuing with travel along the route, and time the voice guidance based on the current travel speed and the current position.

13. The system of claim 12, wherein the system is adapted to recognize when the device is within an initial guidance range from a previous decision point in the route and to perform a corresponding initial voice guidance for the approaching decision point.

14. The system of claim 12, wherein the system is adapted to recognize when the device is within an advance guidance range for the decision point.

15. The system of claim 12, wherein the system is adapted to recognize when the device is within a confirmation guidance range for the decision point.

16. The system of claim 12, wherein the system is adapted to recognize a user-requested prompt for voice guidance.

17. The system of claim 12, wherein the system is adapted to provide an initial voice guidance for the decision point within an initial guidance range from a previous decision point in the route, an advance voice guidance within an advance guidance range for the decision point, a confirmation voice guidance within a confirmation guidance range for the decision point, wherein the initial voice guidance, the advance voice guidance and the confirmation voice guidance provide different prompts to provide specific guidance when the decision point is within the initial guidance range, within the advance guidance range, and within the confirmation voice guidance range.

18. The system of claim 12, wherein the communication channel includes a wireless channel.

19. The system of claim 12, wherein the server includes a remote server.

20. The system of claim 12, wherein the server includes a processor adapted to respond to a request from the navigation device by performing calculations on the navigation data and transmitting the results to the navigation device.

21. The system of claim 12, wherein the navigation device is adapted to communicate with and retrieve navigation data from the server using streaming data.

22. The system of claim 12, wherein the navigation device is adapted to communicate with and retrieve navigation data from the server using cellular communication technology.

23. The system of claim 12, wherein the navigation device includes a processor in communication with a memory, and wherein the processor and the memory are adapted to cooperate to process travel along the route, recognize when the device is approaching a decision point in the route, and provide voice guidance with respect to the decision point.

24. A navigation aid method for negotiating decision points in a route using a navigation device, comprising:
    determining a current travel speed and a current position for the navigation device;
    determining whether the navigation device is approaching a decision point in the route; and
    providing voice guidance to navigate the decision point, wherein timing of the voice guidance is based on the current travel speed and the current position.

25. The method of claim 24, wherein determining a current travel speed and a current position for the navigation device involves a Global Positioning System (GPS).

26. The method of claim 24, wherein determining a current travel speed and a current position for the navigation device includes determining an average speed.

27. The method of claim 26, wherein determining an average speed includes initializing an average speed and determining a current speed.

28. The method of claim 27, wherein initializing an average speed includes accounting for a road classification for a thoroughfare.

29. The method of claim 27, wherein initializing an average speed includes accounting for a speed classification for a thoroughfare.

30. The method of claim 27, wherein initializing an average speed includes accounting for a historical speed.

31. The method of claim 24, wherein determining whether the navigation device is approaching a decision point in a route includes determining whether the navigation device is within an initial guidance range from a previous decision point in the route, and wherein a corresponding initial voice guidance for the approaching decision point is provided from the initial guidance range.

32. The method of claim 24, wherein determining whether the navigation device is approaching a decision point in a route includes determining whether the navigation device is within an advance voice guidance range for the decision point.

33. The method of claim 24, wherein determining whether the navigation device is approaching a decision point in a route includes determining whether the navigation device is within a confirmation voice guidance range for the decision point.

34. The method of claim 24, wherein providing voice guidance to navigate the decision point includes providing an initial voice guidance for the decision point.

35. The method of claim 24, wherein providing voice guidance to navigate the decision point in the route includes providing an advance voice guidance for the decision point.

36. The method of claim 24, wherein providing voice guidance to navigate the decision point includes providing a confirmation voice guidance for the decision point.

37. The method of claim 24, wherein providing voice guidance to navigate the decision point includes:
    detecting a user-requested prompt; and
    providing a user-desired voice guidance for the decision point.

38. The method of claim 24, wherein providing voice guidance to navigate the decision point includes providing an initial voice guidance, an advance voice guidance, and a confirmation voice guidance, wherein the initial voice guidance, the advance voice guidance and the confirmation voice guidance provide different prompts to provide specific guidance when the decision point is within an initial guidance range, within an advance guidance range, and within a confirmation voice guidance range.

39. The method of claim 24, wherein:
    determining whether the navigation device is approaching a decision point in the route includes determining whether the navigation device is approaching a first decision point and a second decision point in the route, and recognizing when the second decision point is within a predetermined range of the first decision point; and
    providing voice guidance to navigate the decision point includes providing voice guidance to navigate both the first decision point and the second decision point prior to reaching the first decision point.

40. The method of claim 39, wherein recognizing when the second decision point is within a predetermined range of the first decision point includes recognizing when the second decision point is within a distance that is approximately 150% of a confirmation distance in a confirmation guidance range for the second decision point.

41. An electronic navigational aid device with voice guidance, comprising:
    a processor;
    a memory adapted to communicate to the processor, the memory being adapted to store cartographic data and a route to a desired destination;

wherein the device is adapted to process travel along the route, wherein the device is adapted to recognize when the device is approaching a decision point in the route, and wherein the device is adapted to provide:
- an initial voice guidance for the decision point within an initial guidance range from a previous decision point in the route;
- an advance voice guidance for the decision point within an advance guidance range from the decision point; and
- a confirmation voice guidance for the decision point within a confirmation guidance range from the decision point, and wherein the initial voice guidance, the advance voice guidance and the confirmation voice guidance provide different prompts to provide specific guidance when the decision point is within the initial guidance range, within the advance guidance range, and within the confirmation voice guidance range.

42. An electronic navigational aid device with voice guidance, comprising:

a processor;

a memory adapted to communicate to the processor, the memory being adapted to store cartographic data and a route to a desired destination;

wherein the device is adapted to process travel along the route, wherein the device is adapted to recognize when the device is approaching a decision point in the route, and wherein the device is adapted to provide voice guidance for the decision point, and wherein the device is adapted to recognize when the device is approaching a first decision point and a second decision point in the route, to recognize when the second decision point is within a predetermined range of the first decision point, and to provide voice guidance for both the first decision point and the second decision point prior to reaching the first decision point.

43. The device of claim 42, wherein the predetermined range is approximately 150% of a confirmation distance in a confirmation guidance range for the second decision point.

44. A navigation aid method for negotiating decision points in a route using a navigation device, comprising:

determining a current travel speed and a current position for the navigation device;

determining whether the navigation device is approaching a decision point in the route; and providing voice guidance to navigate the decision point, including:
- detecting a user-requested prompt; and
- providing a user-desired voice guidance for the decision point.

45. A navigation aid method for negotiating decision points in a route using a navigation device, comprising:

determining a current travel speed and a current position for the navigation device;

determining whether the navigation device is approaching a decision point in the route; and providing voice guidance to navigate the decision point, including providing an initial voice guidance, an advance voice guidance, and a confirmation voice guidance to provide different specific guidance when the decision point is within an initial guidance range, within an advance guidance range, and within a confirmation voice guidance range.

46. A navigation aid method for negotiating decision points in a route using a navigation device, comprising:

determining a current travel speed and a current position for the navigation device;

determining whether the navigation device is approaching a decision point in the route, including determining whether the navigation device is approaching a first decision point and a second decision point in the route, and recognizing when the second decision point is within a predetermined range of the first decision point; and providing voice guidance to navigate the decision point, including providing voice guidance to navigate both the first decision point and the second decision point prior to reaching the first decision point.

47. The method of claim 46, wherein recognizing when the second decision point is within a predetermined range of the first decision point includes recognizing when the second decision point is within a distance that is approximately 150% of a confirmation distance in a confirmation guidance range for the second decision point.

48. A navigation system, comprising:

a mass data storage adapted to store navigation data from which a route can be determined;

a server adapted to communicate with the mass data storage; and a navigation device adapted to communicate with and retrieve navigation data from the server via a communication channel, wherein the system is adapted to process travel along the route, recognize when the device is approaching a decision point in the route, and provide voice guidance for the decision point, and wherein the system is adapted to recognize when the device is within an initial guidance range from a previous decision point in the route and to perform a corresponding initial voice guidance for the approaching decision point.

49. A navigation system, comprising:

a mass data storage adapted to store navigation data from which a route can be determined;

a server adapted to communicate with the mass data storage; and a navigation device adapted to communicate with and retrieve navigation data from the server via a communication channel, wherein the system is adapted to process travel along the route, recognize when the device is approaching a decision point in the route, and provide voice guidance for the decision point, and wherein the system is adapted to recognize a user-requested prompt for voice guidance.

50. A navigation system, comprising:

a mass data storage adapted to store navigation data from which a route can be determined;

a server adapted to communicate with the mass data storage; and a navigation device adapted to communicate with and retrieve navigation data from the server via a communication channel, wherein the system is adapted to process travel along the route, recognize when the device is approaching a decision point in the route, and provide voice guidance for the decision point, and wherein the system is adapted to provide an initial voice guidance for the decision point within an initial guidance range from a previous decision point in the route, an advance voice guidance within an advance guidance range for the decision point, a confirmation voice guidance within a confirmation guidance range for the decision point, wherein the initial voice guidance, the advance voice guidance and the confirmation voice guidance provide different prompts to provide specific guidance when the decision point is within the initial guidance range, within the advance guidance range, and within the confirmation voice guidance range.

51. A navigation system, comprising:

a mass data storage adapted to store navigation data from which a route can be determined;

a server adapted to communicate with the mass data storage; and a navigation device adapted to communicate with and retrieve navigation data from the server via a communication channel, wherein the system is adapted to process travel along the route, recognize when the device is approaching a decision point in the route, and provide voice guidance for navigating through the decision point and continuing with travel along the route, and wherein the system is adapted to recognize when the device is approaching a first decision point and a second decision point in the route, recognize when the second decision point is within a predetermined range of the first decision point, and provide voice guidance for both the first decision point and the second decision point prior to reaching the first decision point.

52. The system of claim 51, wherein the predetermined range is approximately 150% of a confirmation distance in a confirmation guidance range for the second decision point.

* * * * *